United States Patent
Naffziger et al.

(10) Patent No.: US 7,447,941 B2
(45) Date of Patent: Nov. 4, 2008

(54) ERROR RECOVERY SYSTEMS AND METHODS FOR EXECUTION DATA PATHS

(75) Inventors: Samuel D. Naffziger, Fort Collins, CO (US); Don C. Soltis, Jr., Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 535 days.

(21) Appl. No.: 11/184,318

(22) Filed: Jul. 19, 2005

(65) Prior Publication Data
US 2007/0022273 A1    Jan. 25, 2007

(51) Int. Cl.
*G06F 11/00* (2006.01)
(52) U.S. Cl. .............................. 714/12; 714/10; 714/11
(58) Field of Classification Search ............... 714/10, 714/11
See application file for complete search history.

(56) References Cited

U.S. PATENT DOCUMENTS

| | | | | |
|---|---|---|---|---|
| 5,333,280 A | * | 7/1994 | Ishikawa et al. | 712/241 |
| 5,745,725 A | * | 4/1998 | Simpson | 712/214 |
| 6,233,702 B1 | * | 5/2001 | Horst et al. | 714/48 |
| 6,292,845 B1 | * | 9/2001 | Fleck et al. | 710/5 |
| 6,393,582 B1 | * | 5/2002 | Klecka et al. | 714/11 |
| 6,598,199 B2 | * | 7/2003 | Tetrick | 714/766 |
| 2004/0199821 A1 | * | 10/2004 | Flautner et al. | 714/30 |

* cited by examiner

*Primary Examiner*—Scott T. Baderman
*Assistant Examiner*—Kamini Patel

(57) ABSTRACT

Systems and methods for error recovery in an integer execution unit of a multi-core processor are disclosed. In an exemplary embodiment a method may comprise checking parity for a transaction in an execution data path having parallel data registers. The method may also comprise copying one of the parallel data registers to a corrupt data register if parity fails.

20 Claims, 4 Drawing Sheets

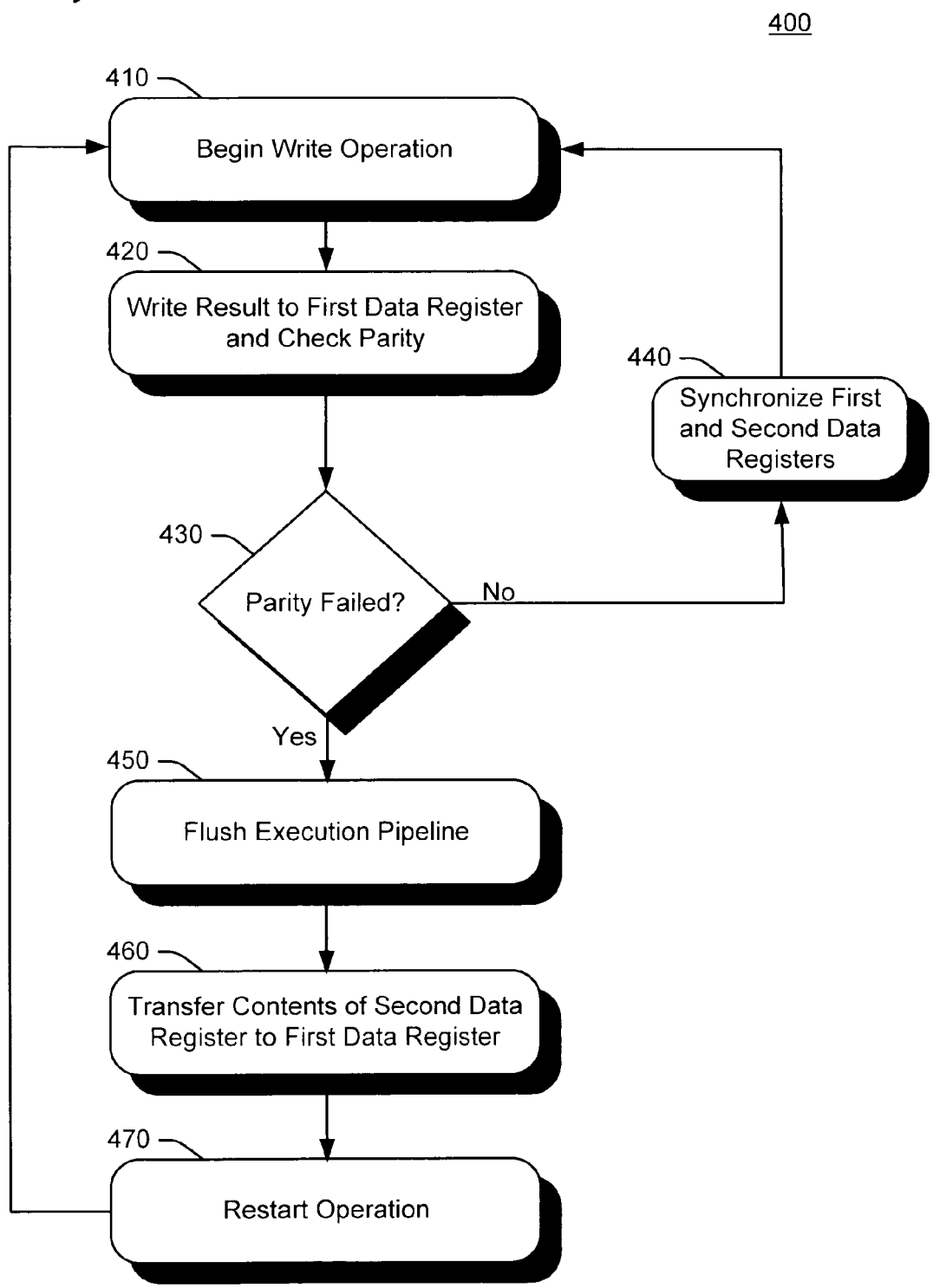

ERROR RECOVERY SYSTEMS AND METHODS FOR EXECUTION DATA PATHS

TECHNICAL FIELD

The described subject matter relates generally to processors, and more particularly to error recovery systems and methods for execution data paths.

BACKGROUND

Central processing units (CPUs) typically include at least one execution data path having execution units and data registers. Data may be stored in the data registers, and the execution units perform arithmetic computations (e.g., add/subtract/compare) on the data. In an exemplary operation, data is issued from the data registers to the execution units for arithmetic computations, and the results of the arithmetic computations are returned to the data registers. These operations incur little delay in short execution data paths. However, CPUs are low commercially available which implement superscalar execution data paths.

Superscalar execution data paths enable more than one instruction to be executed for each clock cycle, thereby increasing throughput. However, the size of superscalar execution data paths increases the physical distance between at least some of the execution units and data registers. This physical distance may result in processing delays, e.g., as data and computation results are issued between the execution units and data registers. In addition, data may become corrupt during transfer between the execution units and data registers.

BRIEF DESCRIPTION OF THE DRAWINGS

FIG. 4 is another flow diagram illustrating exemplary operations for implementing error recovery for write transactions in an execution data path.

DETAILED DESCRIPTION

Briefly, systems and methods described herein may be implemented for error recovery in a processor's execution data path. Exemplary systems and methods described herein may implement an execution data path having parallel sets of execution units (e.g., a set of odd execution units and a set of even execution units) to increase the processor's operating frequency or speed. Each of the parallel sets of execution units includes a full copy of the data register, enabling error recovery during read and/or write operations.

In an exemplary embodiment, parity is checked for transactions during a read and/or write operation using a first data register. During the operation, contents of a second data register are unaffected by parity errors for transaction Using the first data register. Accordingly, if parity fails, the second data register may be used to repair the first data register by transferring contents of the second data register to the first data register.

Exemplary System

Figure 1:
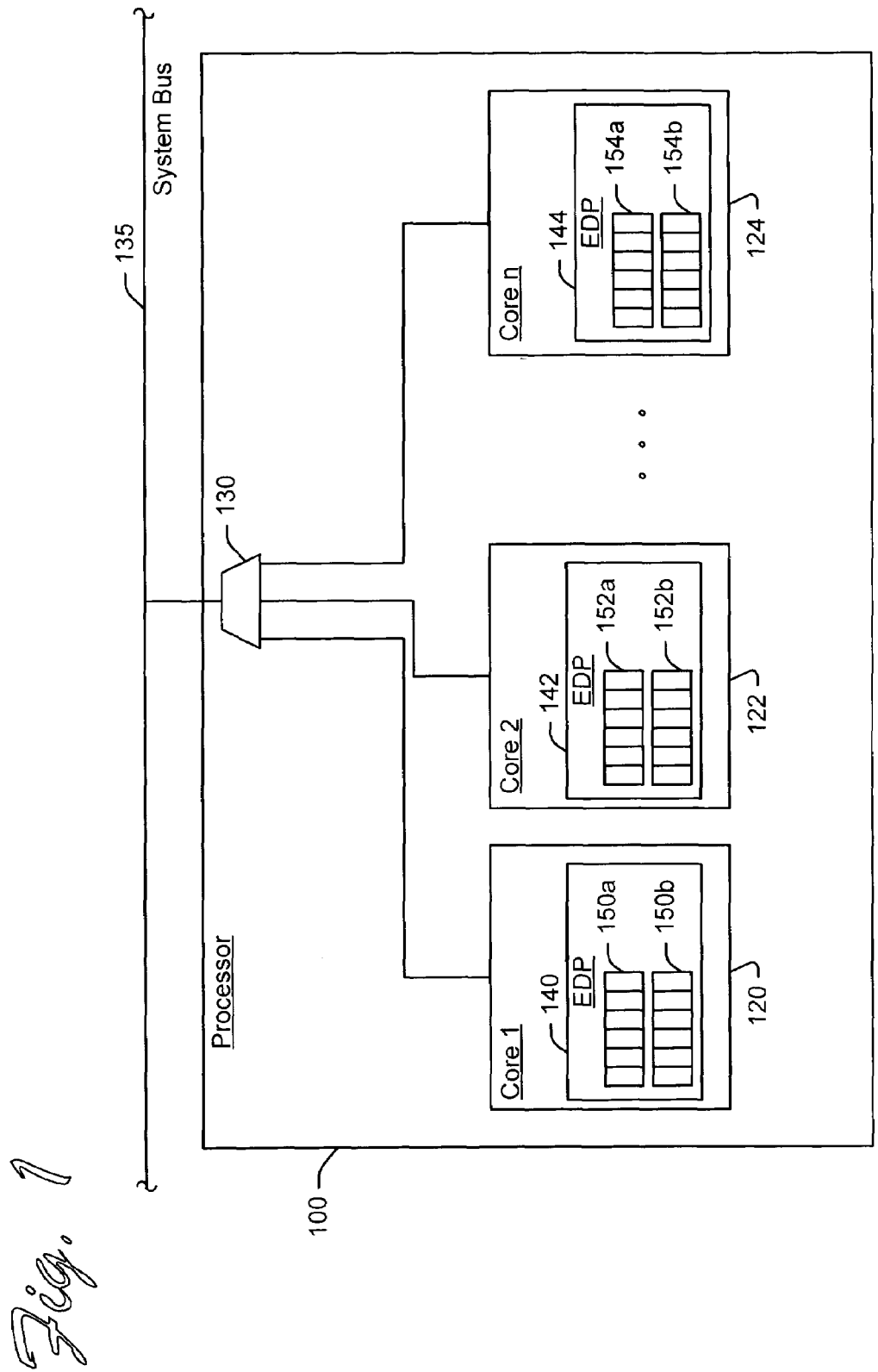
FIG. 1 is a high-level schematic diagram of an exemplary processor which may be used to implement error recovery in an execution data path.

FIG. 1 is a high-level schematic diagram of an exemplary processor which may be used to implement error recovery in an execution data path. Exemplary processor 100 may be implemented as an Intel Processor Family (IPF)-based chip. In FIG. 1, exemplary processor 100 is shown as a multi-core processor, such as the ITANIUM® processor commercially available from Intel Corporation. However, it is noted that exemplary multi-core processor 100 is shown for purposes of illustration and is not intended to be limiting. Nor are the systems and methods described herein limited to use in multi-core processors.

Exemplary processor 100 may include a number of (i.e., one or more) processing cores 120, 122, and 124 (hereinafter generally referred to as processing cores 120). In an exemplary embodiment, the multi-core processor architecture may include two or more processing cores. However, multi-core processor architectures are not limited to any particular configuration.

Exemplary processor 100 may also include a bus interface 130 that couples the processing cores 120 to other system components (e.g., a memory controller, I/O controllers, etc.) via a system bus 135. In an exemplary embodiment, the system bus 135 may be a front side bus (FSB), although the system bus may be implemented using any of a variety of bus architectures now known or later developed.

The processing cores 120 may implement at least one execution data path (EDP) 140, 142, and 144 (hereinafter generally referred to as EDP 140). Each EDP 140 includes execution units and data registers for handling transactions in the processing cores 120. By way of example, the execution units perform arithmetic computations (e.g., add/subtract/compare) on data stored in the data registers. During operation, data is read from the data registers and issued to the execution units. The execution units perform arithmetic computations (e.g., add/subtract/compare) on the data, and generate results. The results are then written to the data registers.

Execution units 210, also referred to as arithmetic logic units (ALUs), perform processing operations on data in the data register based on an instruction. The execution units 210 execute the instruction and return a result (e.g., to the data register). For purposes of illustration, exemplary processing operations may include the following:

$$\text{add } r1 = r2, r3 \tag{1}$$

$$\text{add } r4 = r1, r5 \tag{2}$$

In this example, the execution units may execute the first instruction (1) by adding data from registers r2 and r3 in the data register, and then writing the result to register r1 in the data register. The execution units may then execute the second instruction (2) by adding the result from executing instruction (1) (i.e., data from register r1) and data from register r5 in the data registers, and then writing the result to register r4 in the data registers.

In an exemplary embodiment, one or more of the processing cores 120 may implement a parallel execution data path. A parallel execution data path may include parallel sets of execution units, wherein each set of execution units has a full copy (or mirror image) of the entire data register. An exemplary parallel execution data path 150a, 150b is shown for processing core 1. Likewise, parallel execution data path 152a, 152b and 154a, 154b are shown for processing cores 142 and 144, respectively. Exemplary embodiments of a parallel execution data path are explained in more detail below with reference to FIG. 2.

Figure 2:
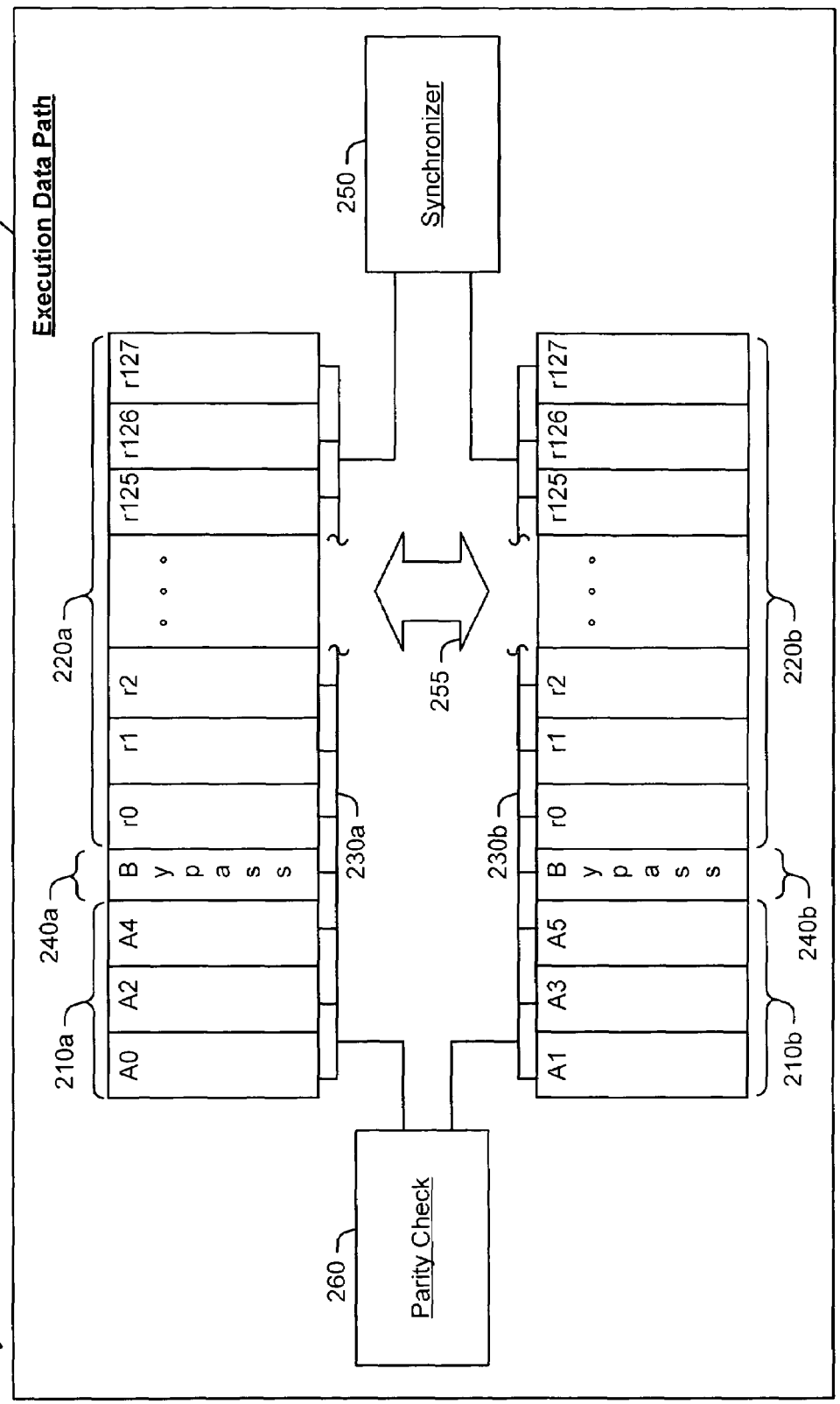
FIG. 2 is a schematic diagram of an exemplary execution data path for a processor.

FIG. 2 is a schematic diagram of an exemplary execution data path for a processor. The exemplary execution data path shown in FIG. 2 may be implemented as a parallel execution data path 200, including two sets of execution Units 210a, 210b each with a full copy of the data register 220a, 220b (i.e., parallel data registers).

The use of a parallel execution data path 200 increases the processor's operating frequency by reducing the distance data has to travel between the execution units (e.g., A0) and registers (e.g. r127) in the data register 220a, 220b during processing operations. Providing parallel data registers 220a, 200b (i.e., a full copy of the data register for each set of execution units 210a, 210b) also enables error recovery operations on the execution data path during processing operations.

Exemplary execution data path 200 may include parallel sets of execution units 210a, 210b. The execution units are coupled to one another and to the data register 220a, 220b via bus wires 230a, 230b, respectively. In an exemplary embodiment, a first set of execution units 210a may include three even units (e.g., A0, A2, and A4). A second set of execution units 210b execution units may include three odd units (e.g., A1, A3, and A5). Accordingly, execution data path 200 may be implemented to process superscalar instructions (e.g., 6-bit wide instructions).

The terms "odd" and "even" as used herein to refer to the execution units is a naming convention for the ALU pipelines. Each cycle up to six ALU operations may be issued to A0, A1, . . . A5. These ALU's are split into two 'clusters' even and odd. If a first operation is issued to an even cluster and a second operation is issued to an odd cluster (the next cycle) and the second operation uses the results of the first, an additional delay is required to move the data from the even cluster to the odd cluster. If the second operation was issued to the even cluster instead, there would be no additional delay. It is noted, however, that implementations described herein are not limited to such a configuration.

Each set of execution units 210a, 210b may be provided with its own copy of the data register 220a, 220b, respectively. Each set of execution units 210a, 210b may also be provided with a bypass network 240a, 240b, respectively. Bypass network 240a, 240b may be implemented to return data back to the execution units 210a, 210b quickly during processing operations, without having to wait for results from executing a first instruction to be returned all the way to the data registers 220a, 220b.

By way of example, bypass network 240a, 240b may be implemented where the result of executing a first instruction (1) is required to execute a second instruction (2). The result from executing the first instruction may be issued to the bypass network and returned to a register (e.g., r125). While the result is being transmitted and written to register r125, the bypass network can return the result to the execution units for executing the second instruction.

Exemplary execution data path 200 may also include management logic, such as, e.g., a synchronizer 250 and parity check 260. Synchronizer 250 may be implemented, e.g., as logic circuitry in the processing core and coupled to the data registers 220a, 220b via bus wires 230a, 230b. Synchronizer 250 maintains copies of the data registers 220a and 220b via an update path (illustrated as update path 255 in FIG. 2).

During operation, synchronizer 250 updates entries in the registers with the results of various processing operations at the execution units 210a, 210b.

By way of example, execution unit A0 may execute an instruction and return the result to register r1 in data register 220a. Synchronizer then updates register r1 in data register 220b with the result so that each data register 220a, 220b includes the same data.

Synchronizer 250 may function with parity check 260. Parity check may be implemented, e.g., as logic circuitry in the processing core coupled to the data registers 220a, 220b via bus wires 230a, 230b. Parity check may be used to test for parity during processing transactions. If a parity error is detected during a processing operation which uses one of the data registers (e.g., data register 220a), the other data register (e.g., data register 220b) is unaffected. Accordingly, the synchronizer 250 may transfer the contents of the "good" data register to the "bad" (or corrupt) data register to repair the "bad" data register.

In an exemplary embodiment, transactions processed in the first set of execution units 210a is read from and written to the first data register 220a, and transactions being processing in the second set of execution units 210b is read from and written to the second data register 220b. It is noted that transactions processed by the first set of execution units 210a does not immediately affect data in the second data register 220b, and vice versa (e.g., until synchronized with one another). Accordingly, if data in a first data register (e.g., data register 220a) is corrupt, data in a second data register (e.g., data register 220b) may be used to correct the first data register (e.g., data register 220a).

During a read operation from one of the data registers, the transaction is checked for parity. If parity is correct, the read operation proceeds. For example, the data is delivered to the execution units to perform arithmetic computations (e.g., add/subtract/compare) on the data.

If parity fails, however, the read operation may be interrupted, the execution data path (or execution pipeline) is flushed, and the data register corrected. That is, data from the second data register may be written to the first data register before attempting to read again from the first data register.

During a write operation to one of the data registers, the result of a processing operation may be written to the first data register. Because parity checks can be time consuming, and not writing data to the data register until after checking parity could slow the processing operations, data may be written to the first data register during the parity check. However, this allows corrupt data to be written to the first data register. Therefore, the first and second data register are not synchronized until after parity is checked for a write operation. If parity fails, the contents of the second data register may be used to overwrite the corrupt data in the first data register. The transaction is then processed again.

The following example is provided to illustrate exemplary operation of the synchronizer 250 and parity check 260. This example implements a pipeline having five stages: REG, EXE, DET, WRB, WB2, as illustrated in Table 1.

TABLE 1

Exemplary Pipeline

| REG | EXE | DET | WRB | WB2 | Comments |
|-----|-----|-----|-----|-----|----------|
| A | * | * | * | * | Operation A is in the REG stage and data is read |
| B | A | * | * | * | Operation A moves to EXE, where a read parity error is detected, and the pipeline is flushed |
| * | * | * | * | * | Pipeline is flushed, data from remote register is transmitted to local register |
| * | * | * | * | * | Data received from remote register file is written to local register file |
| A | * | * | * | * | Operation A is restarted from the REG stage and data will be checked again |

In the REG stage, the register values are read and the previous operation's results (from EXE) are bypassed to become the source for the operation in the REG stage. In the EXE stage, the results of an operation are ready to be bypassed. These result are staged to DET, and forwarded to the remote register file. The result can now be consumed by an operation in REG n the remote cluster. In WRB the results are written to the local register file is read in REG, the pipeline is flushed and the remote register file data is transferred to the local register file, overwriting the "bad" data. The operation may then be retried. If the results transmitted to the remote register file in DET are determined to be incorrect (e.g., by "bad" parity), then the update in WB2 is aborted (e.g., the local register file is written in WRB with the bad data). The pipeline is again flushed, and the previous data in the register file is transferred from the remote to the local register file in case an instruction may have read the register before writing to it (e.g., add r1=r1, r3; where r1 generated bad parity). Then the operation is restarted.

It is noted that the exemplary embodiments discussed above are provided for purposes of illustration. Still other embodiments are also contemplated. For example, the execution data path is not limited to use with superscalar instructions. In addition, the execution data path is not limited to two sets of parallel execution units. The particular design will depend at least to some extent on design considerations.

Exemplary Operations

Figure 3:
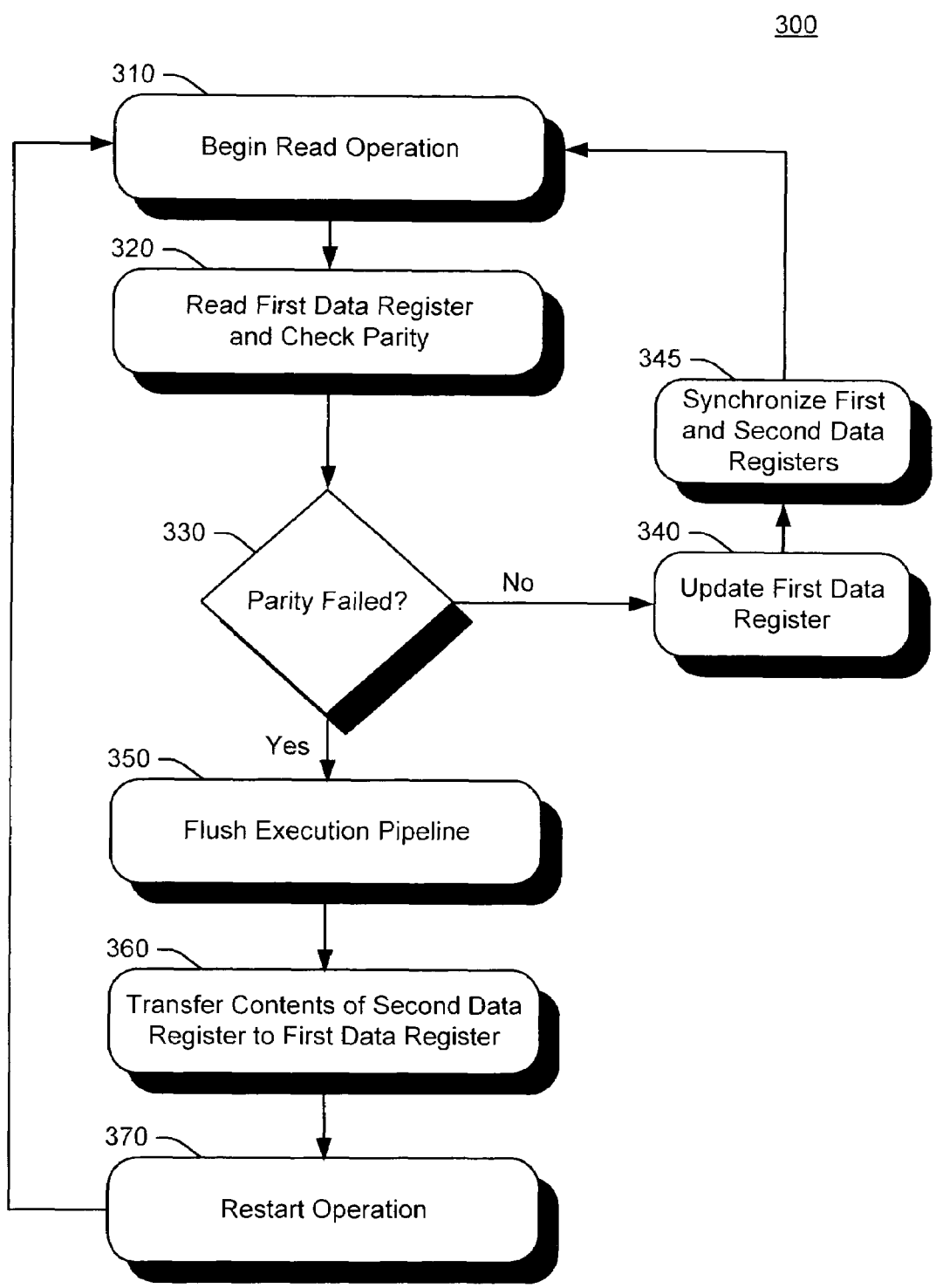
FIG. 3 is a flow chart illustrating exemplary operations for implementing error recovery for read transactions in an execution data path.

FIGS. 3 and 4 are flow diagrams illustrating exemplary error recovery operations. Exemplary error recovery operations may be embodied as logic instructions. In an exemplary embodiment, the components and connections depicted in the figures may be used for error recovery in a processor's execution data path.

FIG. 3 is a flow chart illustrating exemplary operations 300 for implementing error recovery for read transactions in an execution data path. In operation 310, a read operation begins e.g., for an arithmetic operation at the execution units. In operation 320, a first data register is read and parity of the transaction is checked. In operation 330, a determination is made whether parity failed for the transaction.

If it is determined in operation 330 that parity for the transaction is correct, the system may proceed with operations 340 and 345. In operation 340, the first data register may be updated. In operation 345, the first data register is synchronized with the second data register, e.g., if the contents of the first data register changed. The system may then return to operation 310, e.g., for another read operation.

If it is determined in operation 330 that parity for the transaction failed, the system may proceed with operations 350-370. In operation 350, an execution pipeline is flushed. In operation 360, contents of a second data register may be transferred to the first data register. Note that the contents of the second data register are unaffected by the parity error and can be used to correct the first data register. In operation 370 the read transaction may be restarted, e.g., by returning to operation 310.

FIG. 4 is another flow diagram illustrating exemplary operations for implementing error recovery for write transactions in an execution data path. In operation 410, a write operation begins, e.g., to return the result of an arithmetic operation to the data registers. In operation 420 the result may be written to a first data register. In order to speed processing, parity may be checked as the result is being written. Accordingly, corrupt data may be written to the first data register. In operation 430, a determination is made whether parity failed.

If it is determined in operation 430 that parity for the transaction is correct, the system may proceed with operation 440 to synchronize the second data register with the first data register, e.g., so that the second data register also contains the result written to the first data register. The system may then return to operation 410, e.g., for another write transaction.

If it is determined in operation 430that parity for the transaction failed, the system may proceed with operations 450-470. In operation 450, an execution pipeline is flushed. In operation 460, contents of a second data register may be transferred to the first data register, e.g., overwriting the corrupt result data already written to the first data register in operation 420. In operation 470 the write transaction may be restarted, e.g., by returning to operation 410.

The operations shown and described herein are provided to illustrate exemplary embodiments of error recovery in a processor's execution data path. It is noted that the operations are not limited to the embodiments shown. Still other operations may also be implemented to enable error recovery in a processor's execution data path.

By way of example, restarting the operation (e.g., operation 370 in FIG. 3 and operation 470 in FIG. 4) does not need to occur immediately, and may be delayed (e.g., while another transaction is processed). As another example, read (or write) operations do not need to be followed by another read (or write) transaction as illustrated by returning to operation 310 in FIG. 3 (or operation 410 in FIG. 4). Instead, read (or write) transactions may be followed by write (or read) transactions. It is also noted that the terms "first" and "second" data registers are intended to refer to any of the data registers provided in the parallel execution data path and are not limited to any particular data path or number of parallel data paths.

In addition to the specific embodiments explicitly set forth herein, other aspects and embodiments will be apparent to those skilled in the art from consideration of the specification disclosed herein. It is intended that the specification and illustrated embodiments be considered as examples only.

The invention claimed is:

1. A system comprising:
   an execution data path having parallel data registers;
   management logic operatively associated with the parallel data registers, the management logic transferring contents of one of the parallel data registers to another of the parallel data registers if parity for a transaction in the execution data path fails.

2. The system of claim 1 wherein the management logic includes a synchronizer for maintaining the parallel data registers as copies of one another.

3. The system of claim 1 wherein the management logic includes parity logic to check parity of the transaction in the execution data path.

4. The system of claim 1 wherein the management logic flushes at least one transaction in the execution data path if parity fails.

5. The system of claim 1 wherein the parallel data registers are synchronized after a read transaction only if parity is correct.

6. The system of claim 1 wherein a result of a processing operation is written to one of the parallel data registers while checking parity for a write transaction.

7. The system of claim 1 wherein the management logic corrects one of the parallel data registers corrupted by a write operation with contents of another of the parallel data registers.

8. The system of claim 1 further comprising even and odd execution units in the execution data path, the even execution units having a full copy of the parallel data registers, and the odd execution units having a full copy of the parallel data registers.

9. An error recovery method, comprising:
   checking parity for a transaction in an execution data path having parallel data registers; and
   copying one of the parallel data registers to a corrupt data register if parity fails.

10. The method of claim 9 further comprising flushing the execution data path if parity fails.

11. The method of claim 9 further comprising synchronizing the parallel data registers for the execution data path only if parity is correct.

12. The method of claim 9 further comprising writing a result to one of the data registers while checking parity.

13. The method of claim 9 further comprising correcting one of the parallel data registers corrupted by a write operation with contents of another of the parallel data registers.

14. The method of claim 9 further comprising providing even and odd execution units in parallel with one another in the execution data path, the even and odd execution units handling superscalar processing instructions.

15. The method of claim 9 further comprising restarting processing operations after copying one of the parallel data registers to the corrupt data register.

16. A system for error recovery in an execution data path, comprising:
   at least first and second parallel register means for the execution data path;
   means for checking parity of a transaction for the first register means; and
   means for updating the first register means with contents of the second register means if parity fails.

17. The system of claim 16 further comprising means for flushing the execution data path if parity fails.

18. The system of claim 16 further comprising means for synchronizing the at least first and second register means only if parity is correct.

19. The system of claim 16 further comprising means for writing a result to at least one of the register means while checking parity.

20. The system of claim 16 further comprising means for correcting at least one of the register means corrupted by a write operation with contents of another of the register means.

* * * * *

UNITED STATES PATENT AND TRADEMARK OFFICE
CERTIFICATE OF CORRECTION

PATENT NO. : 7,447,941 B2
APPLICATION NO. : 11/184318
DATED : November 4, 2008
INVENTOR(S) : Samuel D. Naffziger et al.

It is certified that error appears in the above-identified patent and that said Letters Patent is hereby corrected as shown below:

In column 1, line 21, delete "low" and insert -- now --, therefor.

In column 5, line 22, after "REG" delete "n" and insert -- in --, therefor.

In column 5, line 23, after "written to" insert -- the local register file, and in WB2 to the remote register file. If a parity error is detected when --.

Signed and Sealed this

Seventh Day of April, 2009

JOHN DOLL
*Acting Director of the United States Patent and Trademark Office*